United States Patent [19]

Rienäcker

[11] Patent Number: 4,621,716
[45] Date of Patent: Nov. 11, 1986

[54] BAGGAGE SET

[76] Inventor: Klaus Rienäcker, Prinzregentenstrasse/Max Josefs-Platz 1, D-8200 Rosenheim, Fed. Rep. of Germany

[21] Appl. No.: 731,290

[22] Filed: May 7, 1985

[30] Foreign Application Priority Data

May 7, 1984 [DE] Fed. Rep. of Germany ... 8413837[U]

[51] Int. Cl.$^4$ .................. A45C 5/00; A45C 13/00; B65D 21/02
[52] U.S. Cl. ..................... 190/108; 190/100; 206/499; 206/501; 206/504; 206/514; 220/23.83; 224/42.42
[58] Field of Search .................. 190/100, 108, 109; 383/907; 206/501, 504, 514, 499; 220/23.83, 23.86; 224/42.42 R

[56] References Cited

U.S. PATENT DOCUMENTS

| 798,377 | 8/1905 | Wood | 206/514 X |
|---|---|---|---|
| 2,429,856 | 10/1947 | Vasquez | 383/907 X |
| 2,497,173 | 2/1950 | Kossow | 224/42.42 R |
| 2,509,537 | 5/1950 | Stier | 383/907 X |
| 3,110,376 | 11/1963 | Naab et al. | 190/109 |
| 3,165,247 | 1/1965 | Burns | 383/907 |
| 3,175,658 | 3/1965 | Bierman | 383/907 X |
| 3,209,971 | 10/1965 | Goodell | 190/108 |
| 3,388,777 | 6/1968 | Nolan | 190/109 |
| 3,710,901 | 1/1973 | Guard et al. | 190/107 |
| 3,749,248 | 7/1973 | Von Boch-Galhau | 220/23.83 |
| 4,086,945 | 5/1978 | Carter | 190/109 |
| 4,090,542 | 5/1982 | Hacker, Jr. | 383/120 X |
| 4,480,774 | 11/1984 | Smith et al. | 383/907 X |

FOREIGN PATENT DOCUMENTS

| 192124 | 12/1907 | Fed. Rep. of Germany | 190/100 |
|---|---|---|---|
| 2484221 | 12/1981 | France | 190/108 |
| 79/00583 | 8/1979 | World Int. Prop. O. | 190/108 |

OTHER PUBLICATIONS

"Modular Cartons for Maximum Cube Utilization" by Patterson et al, IBM Technical Disclosure Bulletin vol. 20, No. 5, 10/1977.

Primary Examiner—William Price
Assistant Examiner—Sue A. Weaver
Attorney, Agent, or Firm—Sixbey, Friedman & Leedom

[57] ABSTRACT

A baggage set comprises in combination, a plurality of substantially parallelpipedic case elements of different sizes, at least one prismatic sloping case element, and at least one stepped case element having a side configured to present a stepped profile. The combination, when stacked in a predetermined manner, permits the baggage set to fill a volume dimensioned to substantially match that of a storage compartment of a particular vehicle.

8 Claims, 5 Drawing Figures

BAGGAGE SET

BACKGROUND OF THE INVENTION

The invention relates to a baggage set, particularly for use in and the optimum utilization of car trunks or boots.

Car trunks are disadvantageous for conventional, normally substantially parallelepipedic cases through not being completely filled by the latter, as a result of a sloping back rest.

It is also the general wish of the user of such baggage sets, to be able to stack them in a maximum space-saving manner, so that of late baggage sets have been made available, in which rectangular cases can be placed within one another, so that they can be easily stowed. However, such baggage sets suffer from the disadvantage that when arranged in juxtaposed manner in the car, they have a step-like silhouette, which does not satisfactorily fill the trunk.

It is frequently undesired for unpacked or poorly packed items of baggage to lie around, particularly in car trunks, but also in other vehicles, such as aircraft, ships and the like. A further disadvantage of such incompletely filled trunk is that e.g. when boats are subject to a heavy swell, the rolling movement leads to the baggage being constantly hurled against the walls, which can damage the cases and the content thereof. It is also desirable in aircraft for the baggage hold to be as completely filled as possible which, in the case of private aircraft, also ensures that there is no undesired non-uniform balance.

SUMMARY OF THE INVENTION

The problem of the invention is to provide a baggage set, which can easily be adapted to the most varied trunk or hold shapes, but which fulfils the requirement of maximum space filling in the most varied vehicle trunks or holds.

According to the invention, this problem is solved by a baggage set comprising a combination of a plurality of substantially parallelepipedic case elements of different sizes, prismatic sloping case element or elements and stepped case element or elements.

Due to the fact that the invention provides different novel case elements, namely stepped and sloping elements, it is possible for the first time to achieve the desired results as a result of these two novel elements combined with a set of rectangular case elements, stackable in one another and matchable thereto.

It is particularly advantageous that the baggage set according to the invention can be matched to the most varied vehicle types as a result of minor modifications, e.g. of stepped cases. It is therefore possible to supply in a satisfactory manner a very wide range of purchasers whilst only using a small number of basic models.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

The drawings show a baggage set for vehicles which in its basic construction comprises stackable, substantially parallelepipedic case elements 1 of different sizes, combined with one or more prismatic sloping case elements 2 and a stepped case element 3.

Figure 1:
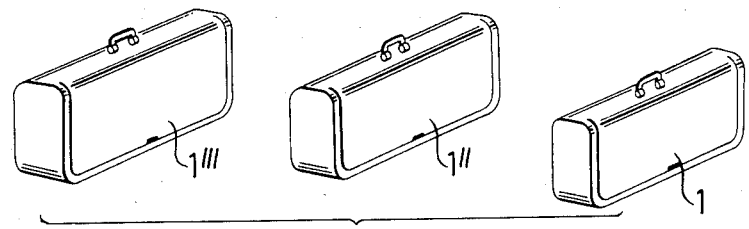
FIG. 1 a perspective view of the substantially parallelepipedic case elements of a baggage set.
Figure 2:
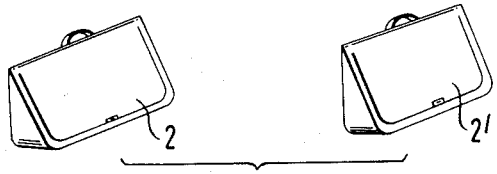
FIG. 2 sloping case elements according to the invention.
Figure 3:
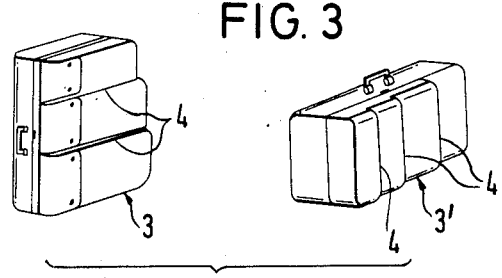
FIG. 3 stepped case elements according to the invention.

The sloping case elements 2 according to the invention are adapted to the different slopes, such as conventionally occur in vehicle trunks. Preferably, they have a side wall, which is inclined by between 55° to 75° to the horizontal. These sloping cases are shown in FIG. 2. The stepped cases 3 according to the invention have steps 4 at right angles to the case base and the depth thereof varies in accordance with the width of the parallelepipedic case elements 1 which can be stacked in one another.

Figure 4:
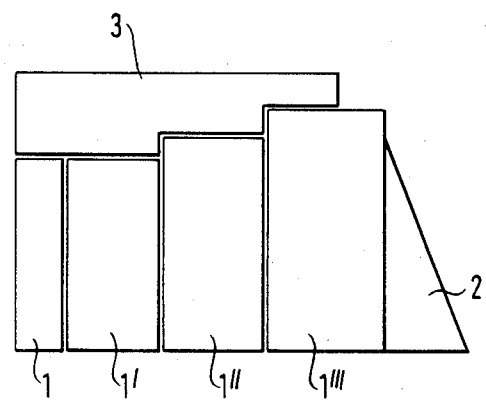
FIG. 4 a lateral plan view of an assembled baggage set according to the invention.
Figure 5:
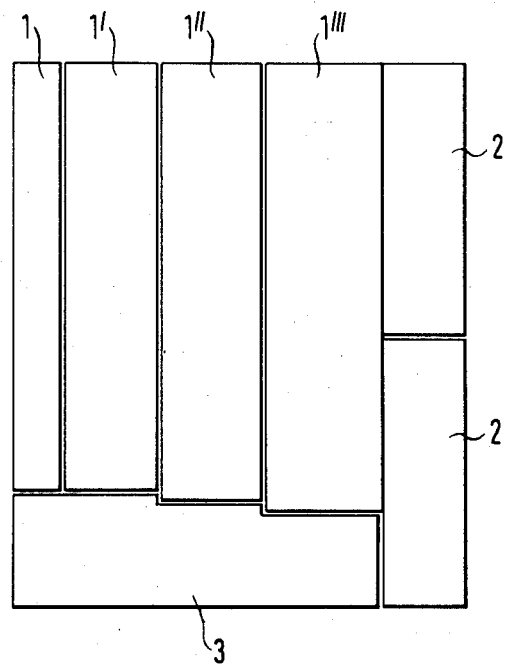
FIG. 5 a plan view of the baggage set shown in FIG. 4.

To provide a better understanding of the invention, the assembled baggage set is shown in side view in FIG. 4. FIG. 5 is a plan view of the arrangement shown in FIG. 4, it being apparent that stepped cases can both be placed on the stepped rectangular cases, which when positioned in succession give a stepped profile, and laterally against said stepped rows of cases, in order to make use of the lateral step resulting from the different sizes.

As a result of the inventive construction of the three basic elements, the possibility is provided for the first time of satisfactorily filling the most varied trunk or hold types by varying the individual elements of the set.

The following baggage set is suitable for the trunk of a medium-sized vehicle, such as the 1982 Golf of Volkswagen AG: 4 square case elements, which can be stowed in one another having the following dimensions: first case element, length 71 cm, height 32 cm, width 16 cm; second case element length 69 cm, height 30 cm, width 14 cm; third case element length 67 cm, height 28 cm, width 12 cm; and fourth case element length 65 cm, height 26 cm and width 10 cm.

The Golf baggage set also includes two stepped case elements, whereof at least one is e.g. constituted by a clothes bag. The dimensions of the first stepped case element are length 60 cm, height 55 cm and width 6 cm, whilst those of the second stepped case element are length 60 cm, height 45 cm and width 6 cm. In addition, two sloping case elements form part of the baggage set which, in the case of a Volkswagen Golf are stowed behind the sloping back rest, both having a length of 45 cm, a height of 36 cm and a width of 14 cm.

It is possible to produce in the same way case elements for any type of trunk, significant parts of the baggage set for a vehicle also being usable for a different vehicle, so that e.g. the baggage set for the Golf is in part also suitable for a Merdedes Benz, if larger/smaller elements and stepped case elements are used.

What is claimed is:

1. A baggage set comprising, in combination, a plurality of substantially parallelepipedic case elements of different sizes which, when said cases are placed side-by-side with a wall of each in planar alignment, present, at another side, a stepped profile, at least one prismatic sloping case element, and at least one stepped case element having a side with a plurality of steps, wherein the steps of the stepped case element are dimensionally coordinated to the the stepped profile of the parallelepipedic cases so as to fit thereagainst in a stacked arrangement, and wherein a side of the sloping case is dimensioned for fitting against a side of the stacked arrangement in a predetermined manner causing the baggage set, as a whole, to fill a volume dimensioned to substantially match that of a storage compartment of a particular vehicle.

2. A baggage set according to claim 1, wherein the sizes of the parallepipedic cases are such as to enable them to be stored, successively one within another, within the largest parallepipedic case.

3. A baggage set according to claim 2, wherein the steps of the stepped case element extend at right angles to the base of the stepped case.

4. A baggage set according to claim 1, wherein the steps of the stepped case element extend at right angles to the base of the stepped case.

5. A baggage set according to claim 4, wherein the sloping case has a right triangular prismatic shape having a sloping side wall at an angle of 55 to 75 degrees with respect to a horizontal base wall thereof.

6. A baggage set according to claim 3, wherein the sloping case has a right triangular prismatic shape having a sloping side wall at an angle of 55 to 75 degrees with respect to a horizontal base wall thereof.

7. A baggage set according to claim 2, wherein the sloping case has a right triangular prismatic shape having a sloping side wall at an angle of 55 to 75 degrees with respect to a horizontal base wall thereof.

8. A baggage set according to claim 1, wherein the sloping case has a right triangular prismatic shape having a sloping side wall at an angle of 55 to 75 degrees with respect to a horizontal base wall thereof.

* * * * *